United States Patent [19]

McMahon

[11] 4,121,788
[45] Oct. 24, 1978

[54] AIRCRAFT MOBILE CHOCK

[75] Inventor: Robert F. McMahon, Denver, Colo.

[73] Assignee: Base Movement Incorporated, Denver, Colo.

[21] Appl. No.: 792,968

[22] Filed: May 2, 1977

Related U.S. Application Data

[63] Continuation-in-part of Ser. No. 596,844, Jul. 17, 1975, abandoned.

[51] Int. Cl.² .............................. B64F 1/12; B64F 1/04
[52] U.S. Cl. ..................................... 244/50; 180/14 C; 188/32; 244/103 R; 280/8; 280/79.1 A
[58] Field of Search ................... 244/103 R, 115, 116, 244/50, 2, 100 R, 100 C; 180/14 C, 9.2 C, 9.2 R, 9.22; 280/8, 13, 47.13 R, 79.1 R, 79.1 A, 28.5; 305/20; 152/330 R; D12/31, 6; 188/119, 32

[56] References Cited

U.S. PATENT DOCUMENTS

| | | | |
|---|---|---|---|
| 1,248,896 | 12/1917 | Olson | 280/79.1 A X |
| 1,571,880 | 2/1926 | Young | 280/8 |
| 2,391,503 | 12/1945 | Page | 180/14 C |
| 2,573,728 | 11/1951 | Pugh | 280/79.1 A X |
| 2,695,718 | 11/1954 | Epps | 180/14 C |
| 2,782,076 | 2/1957 | Miller | 305/20 |
| 2,980,270 | 4/1961 | Elliott et al. | 280/79.1 A X |
| 3,761,040 | 9/1973 | Cummins | 244/2 |
| 3,921,740 | 11/1975 | Forster | 188/119 |

FOREIGN PATENT DOCUMENTS

8,574   6/1894   Switzerland .................... 280/47.13 R

Primary Examiner—Barry L. Kelmachter

[57] ABSTRACT

Mobile platform units for separate selective engagement with the normal ground contact elements of aircraft undercarriage components (inclusive of wheels and tires, etc.) for distributing the usual highly concentrated loadings thereof over a greater ground contact area. The mobile units have a platform supported above ground level by rolling support components that may comprise a plurality of rotatably mounted rollers, or wheels, and/or endless belt tracks disposed thereabout to collectively provide a total ground contact area which is greater than that of the aircraft ground contact element being supported. Ramp components of resilient construction are hinged to the platform in a manner providing a downturned inwardly disposed leg that is adjacent to the rotatably mounted rollers, etc. when the ramp is in a down position whereby the weight of an aircraft on the resilient ramp moves the downwardly turned leg to an interfering position providing braking action for the units. The ramp components when in the up position engage the aircraft ground contact elements to hold the mobile platform unit and aircraft in an operative carrying relationship.

4 Claims, 14 Drawing Figures

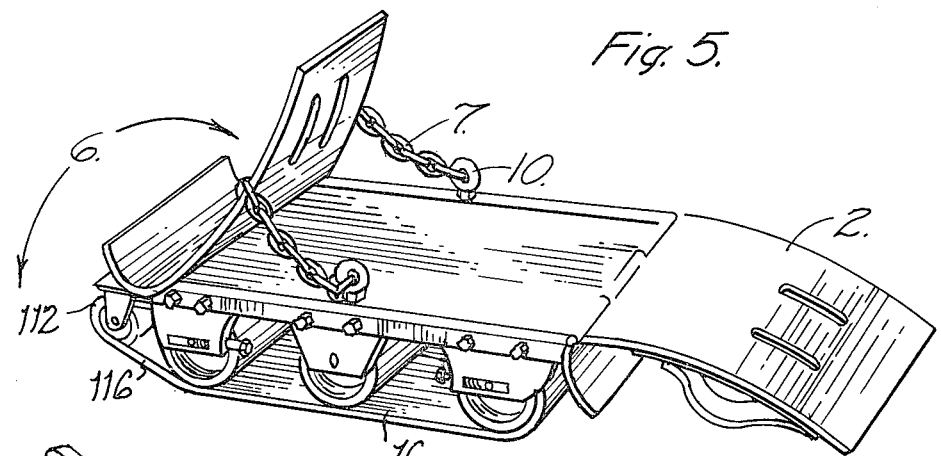
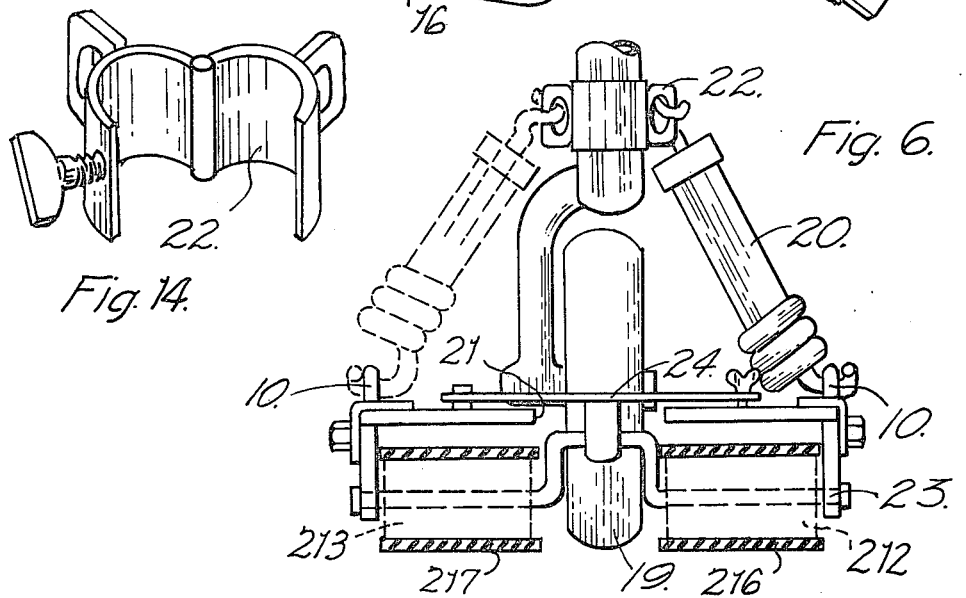
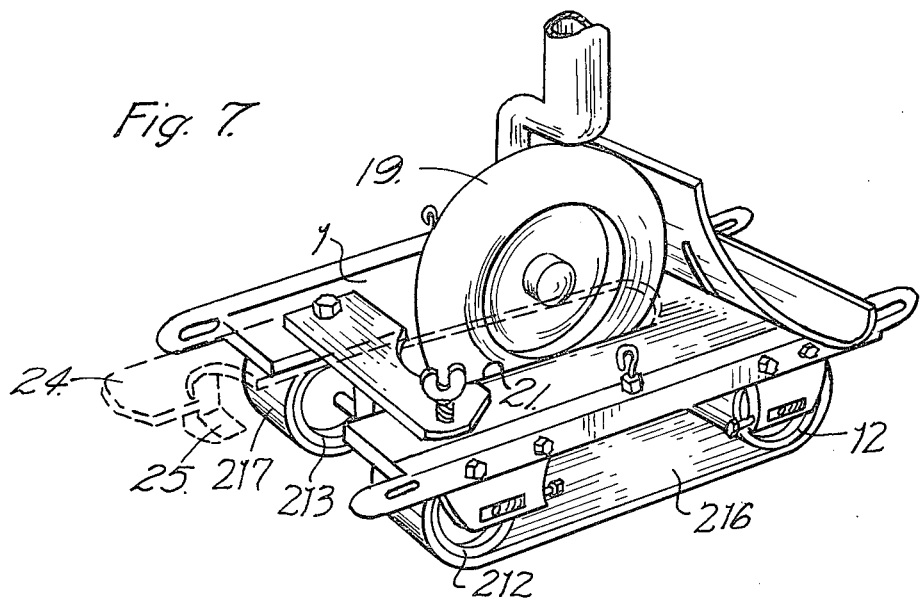

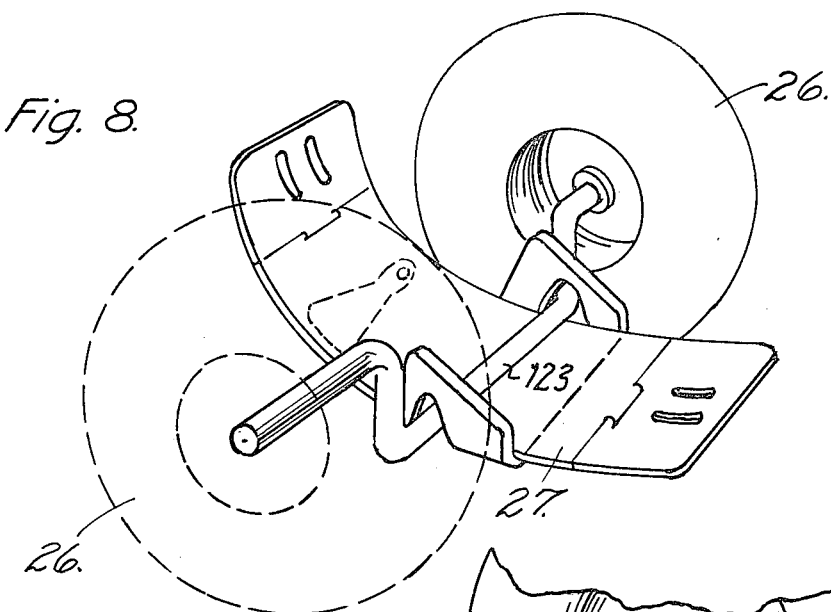
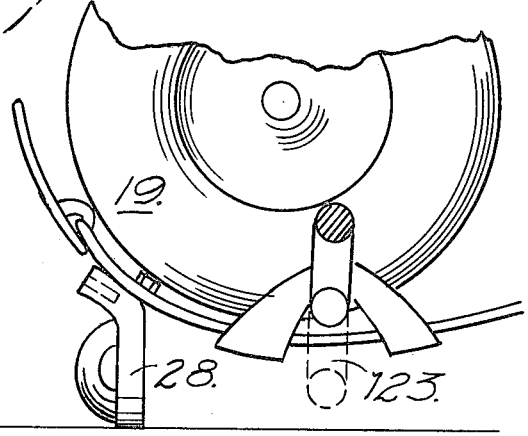
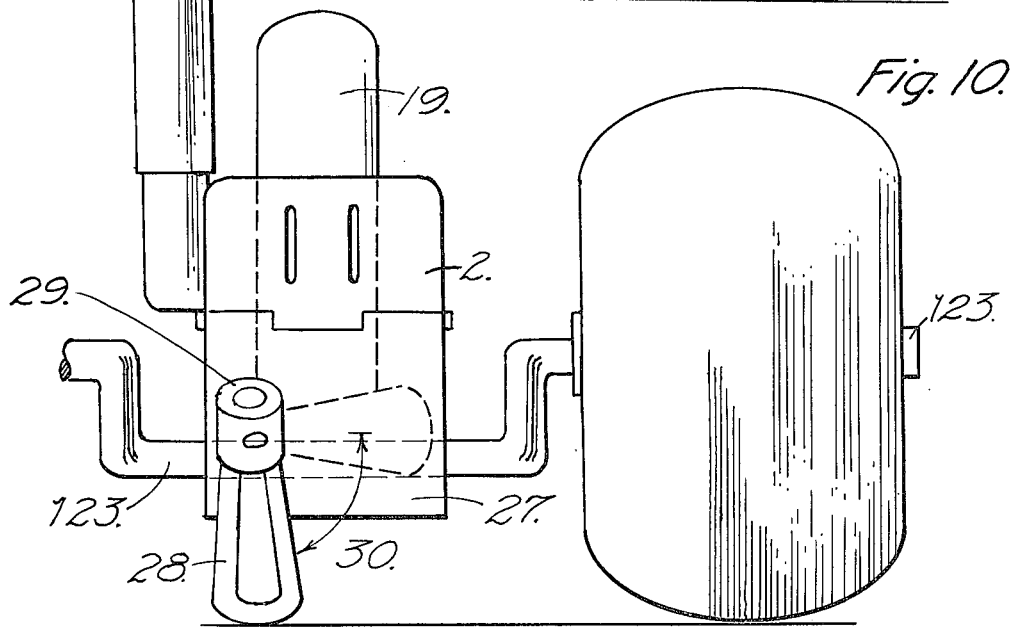

AIRCRAFT MOBILE CHOCK

CROSS-REFERENCE TO RELATED APPLICATION

The present application is related to and is a continuation-in-part with respect to an application by the same inventor filed July 17, 1975, entitled Aircraft Ready Mobility Chock and bearing Ser. No. 596,844 now abandoned.

BACKGROUND OF THE INVENTION

Present day commercial and military aircraft that may be of considerable size and weight are still essentially supported on landing gear disposed in a tricycle configuration. Even though multiple wheels may be used at the separate landing gear positions, all of the weight of the aircraft is essentially concentrated in a three-point stance. The resulting concentrated loadings are considerable, and difficulties are now experienced at airports when aircraft are moved away from the heavily constructed main runways and taxiways that were built to withstand such loadings. When the aircraft is moved off runways that are of adequate construction to auxiliary areas of an airport for servicing or storage, pavement failures are often experienced that may additionally disable the aircraft. These support type failures that are often experienced at airports of even relatively recent design and construction are, of course, an even greater problem if heavy aircraft has to be operated at remote airports that were built to a lesser design requirement. Military aircraft operations at forward areas are severely limited by shortcomings in the design and construction of taxiways and aircraft dispersal areas.

The closest applicable prior art, as at present advised, is represented by the showings in Elliott, et al., U.S. Pat. No. 2,980,270, wherein at least the overall problem of providing improved ground handling capabilities for overweight aircraft is recognized.

SUMMARY OF THE INVENTION

This invention presents an improvement with respect to the prior art and increased utility for potential users through provision of separable and separate mobile platform units that may be selectively applied to the ground contact elements of landing gear installations on an "as required" basis. With such arrangement it is contemplated that for many uses only one or two mobile platform units may be required. Such selective usage is facilitated by the various design configurations for the mobile platform units, the respective rolling support components, and the access ramps utilized. For all embodiments of the invention, application of a mobile platform unit to the landing gear will serve to distribute the normally concentrated loadings of the tires and wheels to an increased ground contact area defined by the wheels, tires, rollers, or endless belts of the rolling support components used for the particular mobile unit. In the preferred embodiment of the invention, the ramp or ramps which provide improved access to the platform additionally provide a braking action that operates to stop any movement of the rolling support components for the mobile unit. For one nose wheel embodiment of the invention, the nose wheel extends through the platform and between separated rolling support components for the mobile unit for somewhat selective contact with the ground. Where the ground support is adequate, the nose wheel will continue to provide at least a part of the support for the landing gear, and the nose wheel will be free to rotate and turn as required. Under deteriorated ground support conditions the nose wheel will be locked to the platform, and all support will be provided by the rolling support components of the mobile unit.

BRIEF DESCRIPTION OF THE DRAWINGS

FIG. 5 is a side perspective view of a second closely related embodiment, FIG. 6 is a front elevation in partial cross and broken section showing features of a nose wheel embodiment, FIG. 7 is a perspective view of such nose wheel embodiment with parts being shown in alternate position, FIG. 8 is a partial perspective view of a third embodiment of the invention, FIG. 9 is a side elevational view of said third embodiment showing the mobile unit applied to an aircraft landing gear tire that is represented in broken section, FIG. 10 is a partial front elevation of said third embodiment, FIG. 14 is a perspective view of a clamp collar adapted for use with the nose wheel embodiment of FIG. 6.

DESCRIPTION OF THE PREFERRED EMBODIMENTS

Figure 2:
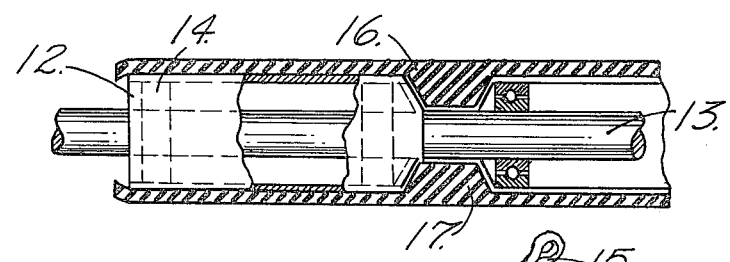
FIG. 2 is a cross-sectional elevation through a roller type rolling support unit.
Figure 3:
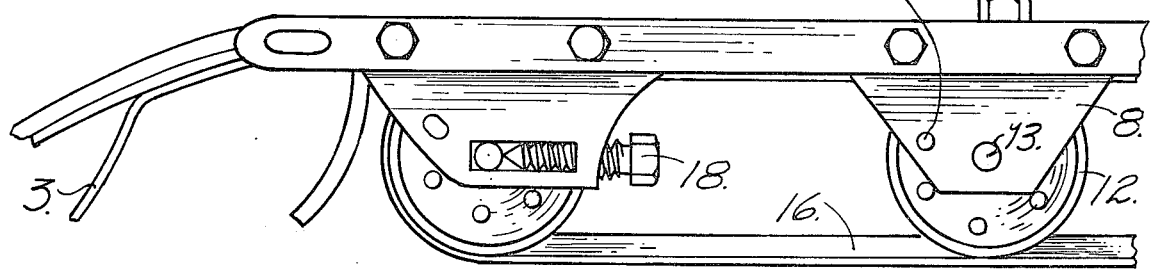
FIG. 3 is a partial side elevation of the FIG. 1 embodiment.
Figure 4:
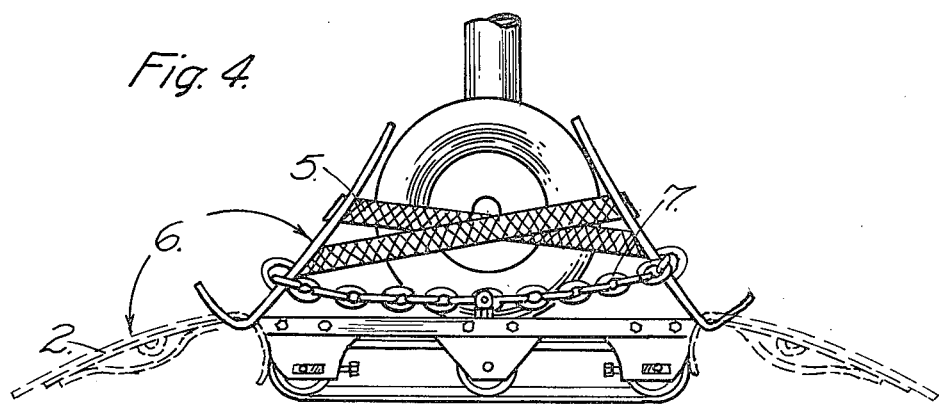
FIG. 4 is a side elevation showing the FIG. 1 embodiment applied to an aircraft landing gear and wheel.

A first and preferred embodiment of the invention is shown in FIGS. 1 through 4 with slight modification thereof being presented in FIG. 5. In these drawings the mobile platform units which are adapted for attachment to the landing gear of an aircraft, as shown in FIG. 4, includes an upper platform 1 upon which the aircraft tire or wheel can be rested. The platform is of general rectangular shape, and it desirably has a length to width ratio of approximately 3 to 1. The total surface area of the platform 1 will in general be determined by the size of the wheel and the weight of the aircraft that is to be supported. Preferably, the platform is of overall plate type construction, and the platform may be provided in steel plate, tempered iron, high strength structural types of aluminum, or of heavy epoxied fiberglass materials.

In order to support the platform 1 above the ground or runway on which it will be used, short legs 8 that extend downwardly from the platform are provided. These legs 8, which are desirably provided of high grade cut and milled steel, may be formed integrally with the deck, or they may be separately fastened thereto, as by the cap screws illustrated. Actually the legs 8 on one side of the mobile platform units should be removable or hinged so that the rolling support components applied beneath the platform 1 to hold it above the supporting ground can be removed.

With the mobile unit embodiments shown in FIGS. 1, 3, 4 and 5, the rolling support components comprise the rollers 12 and an endless belt 16 disposed thereabout. Since a belt and roller combination is provided, at least one group of legs 8 on one side of the platform must be hinged or removable. For purposes of symmetry of construction and assembly, the legs 8 on both sides of the illustrated embodiments are removable. These removable legs are reinforced through use of an overlapping angle iron 9 that is secured by cap screws that pass through holes in the angle iron to engage threaded holes in the legs 8. Eye bolts 10 are similarly engaged through a top segment of the angle iron 9, and threaded holes are provided in the center legs 8 to receive the eye bolts which additionally pass through holes in the platform 1. Additional cap screws or eye bolts may be provided to securely hold the platform 1, the angle irons 9 and the support legs 8 together.

As best shown in FIG. 2, rollers 12 are disposed on axles 13, and the ends of the axles 13 are engaged by openings provided in the support legs 8. The axles 13 for the rollers 12 at the opposite ends of the platform are received in elongated openings provided by the end support legs 8. Set screws 18 that extend into these elongated openings are used to adjust the tension on the endless belt 16 as the axles 13 for the end rollers 12 are moved outwardly when the set screws are tightened. The construction of the rollers 12 as shown in FIG. 2 includes the use of steel shells disposed about sealed bearings 14 that are of sufficient size and number to provide an adequate carrying capacity for the rollers. The axles 13 extend through end caps disposed outboard of the outer bearings 14. To provide an auxiliary rolling support components lock, such end caps provide a plurality of holes at a bolt circle disposition, the radius for which corresponds with the distance from the center roller axle 13 to a transverse hole drilled through the center leg 8 and adapted to receive a cotter pin 15. When the pin 15 is engaged through the transverse hole and through one of the selected openings in the end caps for the roller 12, the associated roller will be locked in place.

All of the rollers 12 are in direct contact with and support a continuous belt 16 that is desirably provided with a ground contact roughened surface tread. Since the support legs 8 are disposed on the outer edges of the platform 1, the area of the belt 16 disposed in contact with the ground or a paved runway is approximately equal to the surface area of the platform provided for the mobile unit. Since the platform area and the ground contact area for the endless belt 16 is of considerably greater area than the ground contact area for a landing gear tire, the load reaction of the landing gear and its tire is distributed to a greatly increased area through use of the endless belts 16. Since the endless belts and their support rollers serve to distribute the sometimes excessive landing gear loadings, the belts are desirably covered with quality materials, such as rubber, neoprene or other substances of similar properties. The belts are also desirably reinforced with fabrics bonded to the cover material with the reinforcing fabric being provided by materials such as nylon, rayon, steel mesh or other cord materials similar to those used in the construction of quality tires.

The interior circumference of the belt 16 has a continuous V or male ridge 17 disposed in the center of the belt at a position corresponding to a provided female circumferential depression at the center of the rollers 12. The continuous ridge 17 provides directional guidance and stability for the endless belt 16 as it moves over the rollers 12.

Figure 1:
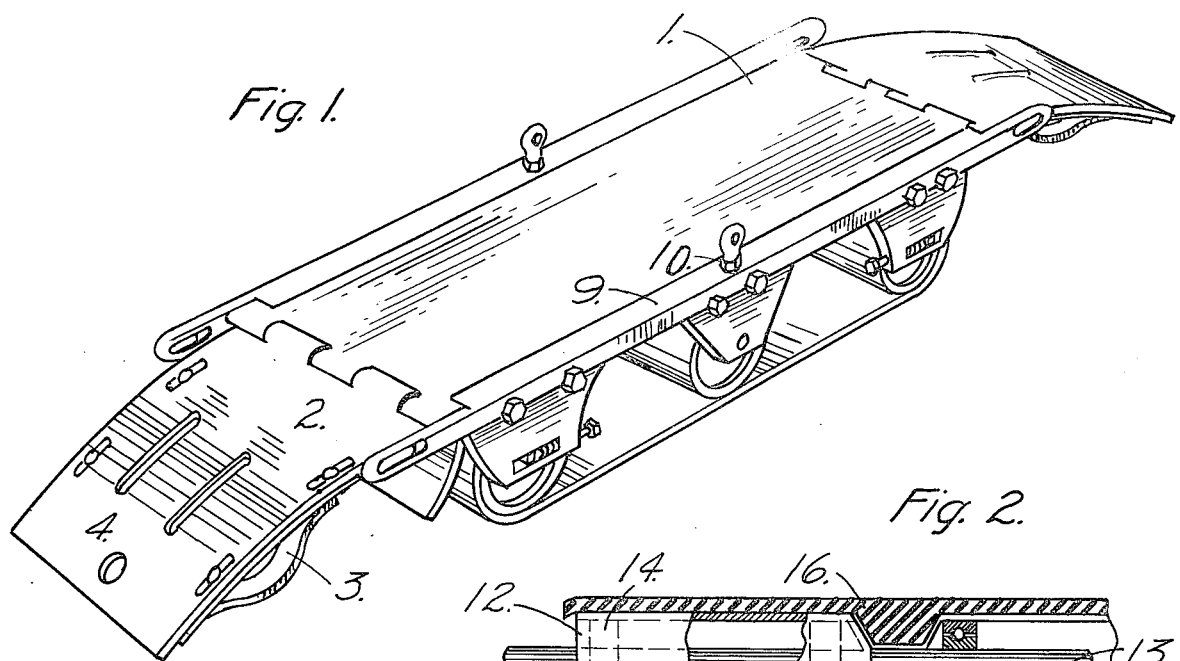
FIG. 1 is a perspective drawing of a preferred and first embodiment of the invention.

At either or both ends of the platform a ramp 2 is provided. The ramps 2 are hinged to the platform 1, and they, accordingly, may be moved to alternate up and down positions. In the up position as illustrated in FIGS. 4 and 5, the ramps 2 are disposed for engagement with the tire or wheel of an aircraft landing gear. In the down position as shown in FIGS. 1, 3 and 5 and by the alternate position representations of FIG. 4, the ramp 2 is disposed with its free end in position for contact with the supporting ground so that an aircraft tire may be rolled up any of the ramps toward the supported position as shown in FIG. 4. Desirably the length of the ramp is determined by the ratio of the height of the platform above the ground level so that the average incline pitch of the ramp in its down position does not exceed 38°. All of the ramps in this first embodiment of the invention and in the slightly modified embodiment shown in FIG. 5 have a downturned inwardly disposed leg at a position past the hinge. This downwardly disposed leg is adjacent to rolling support components for the mobile platform units. The longer incline providing segment of ramp 2 is of slight convex shape to provide a stronger construction. Spring steel reinforcing leaves 3 are also provided that can be attached to the inclined ramp by bolts that are extended through the spring leaves and through elongated slotted holes provided in the ramp. The slight convex shape of the ramp and the shape and strength of the springs and the elongated holes are of cooperative design characteristics so that the long inclined convex portion of the ramp 2 will be able to flex as a load is applied by the aircraft landing gear as its wheel is moved along the inclined portion of the ramp. Desirably, engagement of the aircraft tire and the ramps will cause a flexing action of the ramp that will serve to move the downturned inwardly disposed leg of the ramps to an interfering position with respect to the endless belt 16 disposed about the end rollers 12 or other rolling support components. This interengagement between the downturned leg and the belt rolling support components will brake such rolling components in a manner that holds the mobile unit and its platform 1 in fixed relative position to receive the landing gear wheel and tire.

Slots 4 are provided in the ramps 2 in off-center position but desirably parallel to the length of the ramps. These slots are to accommodate the heavy cargo tie-down straps 5 shown in FIG. 4 which are used to secure the ramps in the up position 6 and to hold the ramps 2 in secure engagement with the tire of the aircraft landing gear. Safety chains 7 may also be applied to extend between the eye bolts 10 and holes or loops provided by the ramps. Safety chains 7 and tie-down straps 5 may be used conjointly or separately to secure the ramps 2 in the up position.

With a slightly modified second embodiment of the invention as presented in FIG. 5, the endless belt 16 is disposed about the regularly sized support rollers 12 and is also extended around a forwardly disposed raised roller 112 that is of smaller size than the regular support rollers 12. Roller 112 is also disposed at an elevated position, and, accordingly, an upwardly extending segment 116 for the endless belt 16 is provided. The smaller rollers 112 and the upwardly extending segment 116 are, of course, provided to make it easier for the rolling support components to move into contact with and over minor obstructions that might be encountered as the mobile platform units move along the ground or runway surface to carry the aircraft from one point of use to another.

Components of a nose wheel embodiment are shown in FIGS. 6, 7 and 14. For this mobile platform unit, the platform 1 is essentially divided through most of its length by an elongated slot 21 that is of size to accommodate a nose wheel landing gear tire 19. When the mobile platform unit of this embodiment is to be affixed to the nose wheel, a lock bar 24 is moved to an open position as shown in dotted outline in FIG. 7. Crank axle 23 of the endless belt rolling support components which provides support for the forward rollers has a crank arm center segment which is lowered when it is disengaged from the latch 25, and the nose wheel is rolled over such center segment of crank axle 23 to be engaged in the elongated slot 21 and between the axles for the support rollers. When the nose wheel is in position, the lock bar 24 and its latch will be moved to the full line representation position, and the latch 25 will then engage the crank arm segment of crank arm 23 to hold it in raised position. At the same time the lock bar 24 is now in position for engagement with the nose wheel tire 19 if the ground contact surface of the tire is caused to drop beneath the level established by ground contact flights of the divided and separate supports belts 216 and 217. Effectively, the lock bar 24 in its closed position limits the length of the elongated slot 21 to a length less than the diameter of the tire. Such separate belts 216 and 217 are positioned to course about a rear support roller 12 and the front divided rollers 212 and 213 disposed on crank axles 23.

With this arrangement wherein the mobile platform unit embodiments may be of lower profile and wider than those of the first embodiment, the nose wheel will essentially stay in contact with harder high load supporting type ground surfaces. Contact between the nose wheel and an adequate support surface will provide improved steering; and the aircraft may, accordingly, be moved and steered along well compacted and prepared surfaces with little difficulty. If softer ground support surfaces are encountered, however, where the nose wheel would ordinarily tend to dig in, a ground support failure will merely bring the nose wheel tire 19 into contact with the platform 1 and the locking bar 24, and rotation of the nose wheel will be interrupted. At the same time narrow support belts 216 and 217 disposed on either side of the slot 21 and nose wheel 19 will tend to distribute the load reaction of the nose landing gear over a greatly increased ground contact surface area. Movement of the aircraft can be continued.

In FIG. 6 stabilizer arms 20 are provided which extend between the eye bolts 10 and a clamp collar 22 that is applied to the nose wheel strut. Details of the clamp collar 22 are shown in FIG. 14. As illustrated, the hinge joined halves of the clamp collar 22 may be moved to a closed position about the nose wheel strut to be secured thereto. The stabilizer arms 20, which actually have limited travel, are essentially of shock absorber type design, and they are additionally provided with auxiliary springs to absorb compression loadings as these mobile platform units are moved along irregular ground support surfaces.

For a third embodiment of the invention as shown in FIGS. 8, 9 and 10, the rolling support components are pneumatic tires of low profile and wide tread configuration. Such tires 26 are disposed on wheels and hubs engaging a dropped center axle 123, the offset dropped center segment of which engages and provides support for a platform 27 and the hinge attached ramps 2. For this embodiment the platform 27 is of curved shape with the curve or cupping thereof somewhat corresponding to the diameter of the landing gear wheels for aircraft that are to be carried by these mobile platform units. Since only a single axle is provided, the platform 27 and its end ramps 2 may be moved with the axle to adjusted angular positions which will bring a forwardly disposed ramp 2 into contact with the ground support surface so that the landing gear wheel may be moved to the supported position illustrated in FIG. 9. As the aircraft wheel is moved over the ground contacting end ramp 2 and to and over the drop center axle 123, the weight of the aircraft shifts to the platform 27 to be received by its cradling shape. A part of the aircraft weight will be restrained by a rotatable movable metal block 28 disposed on the underside of the platform 27. Engagement of the metal block 28 with the ground support surface will stabilize this mobile platform unit so that the landing gear wheel will be secured in such position by application of tie-down straps, such as the straps 5 of FIG. 4, or other restraining devices. After the landing gear wheel has been secured in the illustrated position, the metal block 28 may be rotated to its alternate position as shown in dotted outline in FIGS. 8 and 10, and the full load reaction of the aircraft landing gear being supported will then be transmitted by the platform 27 to the drop center axle 123 and to the outrigger disposed rolling support outrigger tires 26.

This mobile platform unit embodiment, which utilizes pneumatic tires as the rolling support components, is well adapted for use where aircraft must be moved over ground surfaces that might not be traverseable with the earlier belted roller support component configurations. This third embodiment is well adapted for use where rough or rocky ground surface conditions may be encountered, or where swampy and heavy grass covered areas, or crusted and drifted snow might be expected. Where stones or rocks that might damage the endless belts of the FIGS. 1 and 6 embodiments might be expected, use of this tire supported mobile platform unit is suggested since the tires are of a design to roll over small and sharp rocks without damage. Tires of steel belted construction are suggested to prevent stone and stone fragment punctures and in order to provide mobile platform units that will turn easily.

Figure 11:
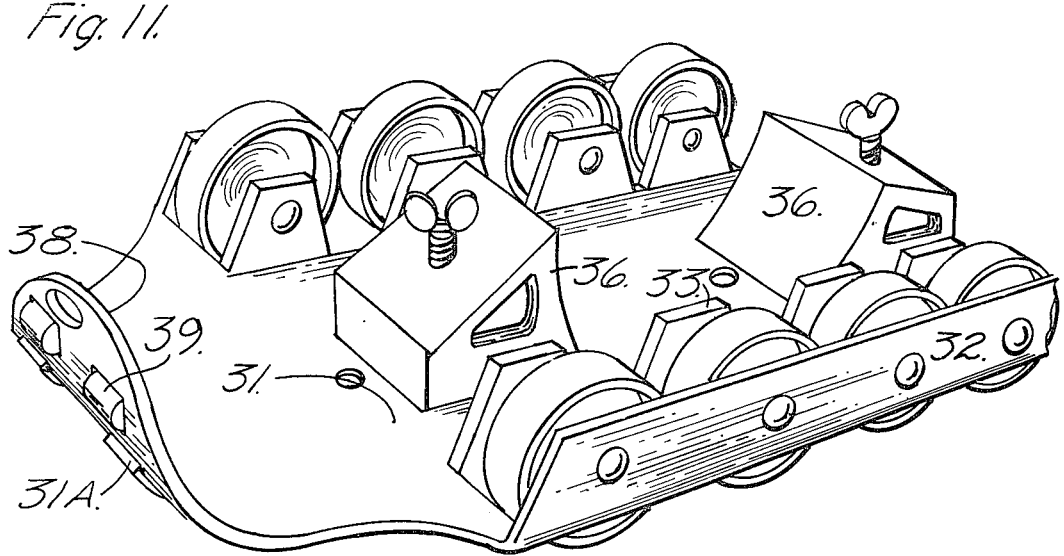
FIG. 11 is a perspective view of a fourth embodiment of the invention shown in broken section.
Figure 12:
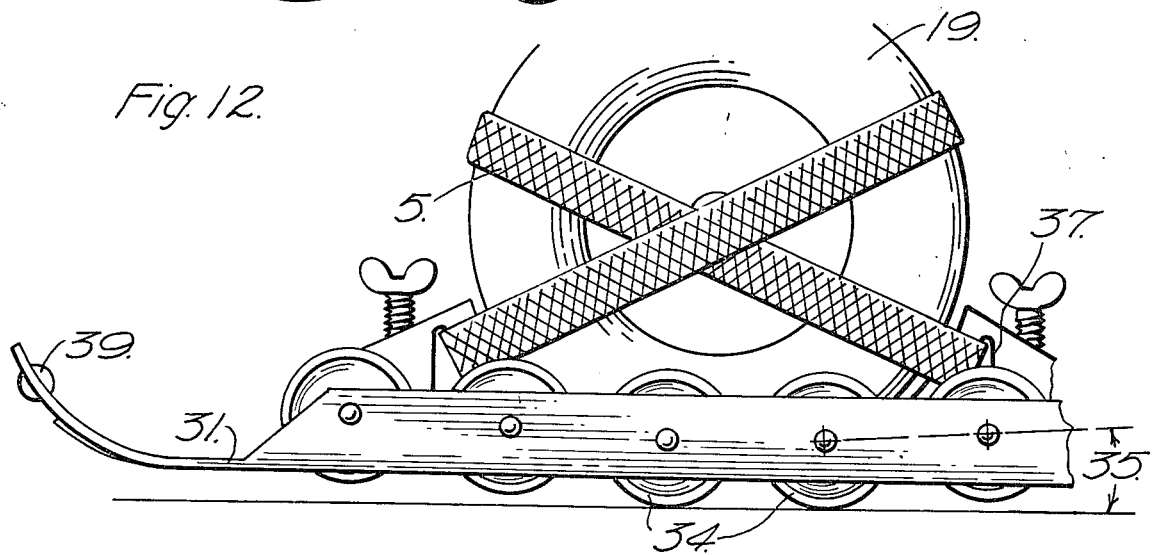
FIG. 12 is a side elevation of said fourth embodiment showing the unit attached to an aircraft landing gear tire.
Figure 13:
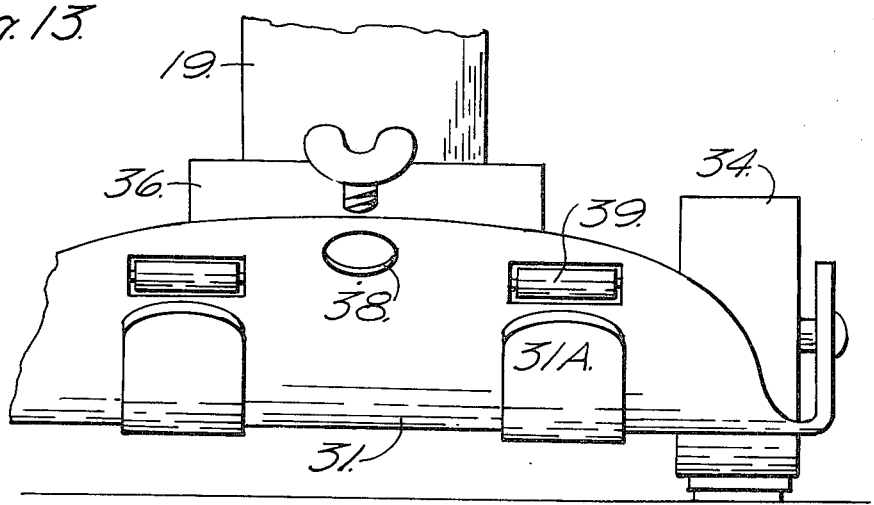
FIG. 13 is a partial front elevation of said fourth embodiment.

A fourth embodiment of the invention is shown in FIGS. 11, 12 and 13. Mobile platform units of this fourth embodiment are intended for use when aircraft must cross boggy surfaces, exceedingly high grass, crusty snow and ice, or soft sand surfaces. All of such ground surfaces have a low order ground support characteristic, and it is, of course, then necessary to provide an increased ground contact surface area. For this fourth embodiment of the invention, the desired increased ground contact area for passing over such difficult surfaces is provided by a sled or ski type construction in which the bottom surface of the platform 31 itself may come into contact with the ground surface for sliding movement therealong. At the same time when the sled type structure is to be operated over hard surfaces having good ground support characteristics, a plurality of rollers or wheels 34 are provided which extend through the platform for contact with such improved surfaces. In both FIGS. 11 and 12 the rear section of the mobile platform unit has been broken away, and in FIG. 11 the length of the mobile unit itself is foreshortened by the perspective illustration utilized. The actual mobile unit could be eight or nine feet in length, and it is intended that the tire of an aircraft landing gear 19 will be received in position adjacent the center of the total length of the mobile unit and its platform 31. Accordingly, a greater number of wheels than that illustrated will ordinarily be used.

The platform 31 will ordinarily be formed of steel, high tensile strength aluminum, or reinforced fiberglass material. Additionally, it is desirable that the platform 31 be reinforced on its underside through application of spring steel skids 31A that double as longitudinal flex and stress supports. Side flanges 32 formed integrally with the base platform 31 and bent upwardly during construction of the platform provides outboard support for the wheel axles of multiple wheels 34. Inboard support for the wheel axles is provided by a plurality of separate inner flanges 33 that are disposed parallel to the outer flanges 32. If the platform 31 is formed of metal, such inner flanges can be punched and raised from the material of the platform 31, since holes must be additionally provided through the platform for extension of the plurality of small side dolly or boggie type wheels 34. The axles for such wheels necessarily are engaged and supported additionally by such inner flanges 33.

The wheels 34 extend only a slight distance past the lower surface of the platform 31 and/or the skids 31A. In such position the wheels 34 will come into contact with hard improved ground surfaces and will provide rolling support for the mobile platform units of this embodiment when coursing over such improved surfaces. At the same time it is desirable that the wheels do not extend downwardly to such extent as to seriously impair skidding type operations when poor ground surfaces are to be crossed. Accordingly, it is desirable that while up to six center wheels disposed directly under the aircraft wheel 19 might be in flat level position one with respect to the other, the remaining wheels disposed forwardly and rearwardly thereof may be raised at a graduated level away from such center wheels. In FIG. 12 a raise of approximately 10° to 12° for the following wheels is suggested. This gradual elevation of the wheels at both ends of the mobile unit allows for non-interference as the units are moved along prepared ground surfaces of undulating or irregular contour. At the same time the tapered positioning of the boggie wheels with relation to the underside of this sled type mobile unit also reduces the friction losses that are encountered due to the depending wheels when the platform is operating as a sled to cross non-hardened ground surfaces. Where extensive use over hard prepared surfaces is contemplated, the center boggie wheels disposed adjacent the landing gear support position may be replaced with wheels of swivel type to provide added manueverability for the mobile units.

In order to secure landing gear components or tires to the mobile units, restraining blocks 36 are provided that may be attached to the platform 31 by wing screws. The blocks 36 are slotted, as at 37, to accommodate tie-down straps 5. The prow 38 of platform 31 is desirably provided with a plurality of small rollers 39 in position adjacent the steel skids 31A to facilitate removal of such prow or tip from under aircraft wheels and to initiate movement of the prow 38 and platform 31 up and over obstructions that might be encountered when a mobile unit is being used as a sled.

All of the mobile unit embodiments 1 through 4 do not require separate suspension systems in order to absorb the shocks that may be encountered as the mobile units move along and over rough and uneven surfaces. Any major shock loads are received by the carried aircraft's landing gear tires or wheel suspension system. The total size, construction and reinforcing for each of the mobile unit platforms, and the size, ground contact area and mounting of the rolling support components can be modified for strength and reinforced as needed depending on the gross weight of the aircraft that is to be carried. When used with lightweight aircraft of under 14,000 pounds, lighter weight and less expensive materials and construction may be used. For FIG. 1 type embodiments, a downturned edge of the platform 1 itself might be used in substitution for the legs 8 to provide adequate support for the axles 13 of rollers 12. Alternately, a separate and separable angle might also be used for such purpose in order to facilitate servicing of the rollers.

While the main use for all of the described mobile platform unit embodiments contemplates the attachment of the mobile units to the landing gear of aircraft having fully inflated tires so that the aircraft can be moved over difficult terrain, it should be obvious that the mobile units may also be used for emergency handling of flat and blown tire situations. It should further be recognized that any of the mobile platform units described can, with suitable cribbing or through use of expandable air bags, be attached to other surfaces and components of disabled aircraft to facilitate movement of the aircraft.

Further, while the main use for the units is intended for ground handling purposes, it should be recognized that a mobile platform unit, such as the unit of FIG. 4, that is fully secured to a landing gear wheel and tire could also be used in limited flight situations if movement of a disabled aircraft between advance bases was imperative. The form of invention shown in FIGS. 8, 9 and 10 is especially well adapted for use at the main landing gear of aircraft for this limited flight purpose.

I claim:

1. A mobile platform unit for separate selective engagement with components of aircraft inclusive of wheels and tires for distributing the usual highly concentrated loadings thereof over a greater ground contact area when the aircraft is to be moved over otherwise inadequate ground support surfaces comprising a platform adapted to receive at least one of said aircraft components, an axle element engaged and supported by said platform, rolling support components on said axle element for extension past lower surfaces of said platform for contact with the ground support surface whereby movement of said mobile platform unit and attached aircraft is facilitated and further comprising a ramp therefor at an end of said platform, said ramp being movable to an up position where said ramp is engaged against the at least one aircraft component being carried and to an alternate down position providing an inclined approach surface facilitating movement of said at least one aircraft component to its carry position on said platform, and primary lock means associated with said ramp for engagement with said rolling support components for preventing movement thereof when the ramp is in the down position wherein said primary lock means comprises an extension element attached to said ramp and positioned adjacent said rolling support components wherein said ramp and extension element are formed integrally as parts of said ramp and further comprising a hinge for mounting said extension element and ramp to said platform with said ramp and extension element being on opposite sides of said hinge.

2. The mobile unit as set forth in claim 1 wherein the ramp is of resilient construction and said extension element is a downturned leg of said ramp whereby the resilience of said ramp as the at least one aircraft component is received thereon operates said primary lock means.

3. A mobile platform unit for separate selective engagement with components of aircraft inclusive of wheels and tires for distributing the usual highly concentrated loadings thereof over a greater ground contact area when the aircraft is to be moved over otherwise inadequate ground support surfaces comprising a platform adapted to receive at least one of said aircraft components, an axle element engaged and supported by said platform, rolling support components on said axle element for extension past lower surfaces of said platform for contact with the ground support surface whereby movement of said mobile platform unit and attached aircraft is facilitated wherein said axle element is of drop center construction and further wherein said rolling support components comprise a plurality of wheels on opposite ends of said axle element and disposed outwardly of said platform, said at least one aircraft component being disposable on said platform and interiorly of said wheels wherein said platform is of curved construction for conformance with a wheel and tire component of said aircraft wherein said drop center axle is disposed above said platform for engagement by said at least one aircraft component carried by said mobile unit.

4. A mobile platform unit for separate selective engagement with components of aircraft inclusive of wheels and tires for distributing the usual highly concentrated loadings thereof over a greater ground contact area when the aircraft is to be moved over otherwise inadequate ground support surfaces comprising a platform adapted to receive at least one of said aircraft components, rolling support components for extension past lower surfaces of said platform for contact with the ground support surface whereby movement of said mobile platform unit and attached aircraft is facilitated wherein said mobile unit is of sled type configuration with said platform providing openings therethrough for reception of said rolling support components wherein said rolling support components comprise a plurality of axles and wheels disposed along sides of said platform with a lower ground contact face of said wheels being only slightly below said platform and with said wheels being useful to move the mobile unit over prepared hard ground support surfaces wherein said wheels are disposed at varied vertical positions with respect to said platform to provide progressive wheel exposure beneath said mobile unit along the length of said mobile unit.

* * * * *